(12) United States Patent
Ohta et al.

(10) Patent No.: US 7,668,221 B2
(45) Date of Patent: Feb. 23, 2010

(54) GAS LASER APPARATUS, AND METHOD AND DEVICE FOR MONITORING BLOWER

(75) Inventors: Kazuya Ohta, Fujiyoshida (JP); Akira Egawa, Gotenba (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 190 days.

(21) Appl. No.: 11/896,554

(22) Filed: Sep. 4, 2007

(65) Prior Publication Data
US 2008/0056325 A1 Mar. 6, 2008

(30) Foreign Application Priority Data
Sep. 4, 2006 (JP) ............................. 2006-238982

(51) Int. Cl.
*H01S 3/22* (2006.01)
(52) U.S. Cl. .................... 372/58; 184/6.4; 184/6.11; 184/103.1; 184/108
(58) Field of Classification Search ............ 184/6.4, 184/6.11, 103.1, 108; 372/58
See application file for complete search history.

(56) References Cited

U.S. PATENT DOCUMENTS 3,934,678 A * 1/1976 Jennings .................. 184/103.1

FOREIGN PATENT DOCUMENTS

| EP | 0480059 B1 | 4/1992 |
|---|---|---|
| EP | 0 480 059 A1 | 5/1992 |
| JP | 62-261765 | 11/1987 |
| JP | 2-41791 | 2/1990 |
| JP | 2622424 | 4/1997 |
| JP | 2006-63881 | 8/2004 |

OTHER PUBLICATIONS

European Search Report mailed Apr. 17, 2008 issued in European Application No. 07017217.6.

* cited by examiner

*Primary Examiner*—Minsun Harvey
*Assistant Examiner*—Joshua King
(74) *Attorney, Agent, or Firm*—Drinker Biddle & Reath LLP

(57) ABSTRACT

A gas laser apparatus including a laser oscillating section including a blower forcibly circulating a medium gas in a medium circuit, and a blower monitoring section monitoring a maintenance state of the blower. The blower includes a lubricant storage chamber storing a lubricant, and a lubricant monitoring chamber connected to the lubricant storage chamber to ensure fluidic communication therebetween at a position lower than an oil level of a lubricant having a predetermined appropriate volume and stored in the lubricant storage chamber. The blower monitoring section includes a lubricant detecting section detecting that a lubricant stored in the lubricant storage chamber of the blower flows into the lubricant monitoring chamber and at least a part of the lubricant is present in the lubricant monitoring chamber, as a result of internal-pressure change in the lubricant storage chamber, and a lubricant-change judging section monitoring whether the lubricant detecting section detects a presence of the lubricant in the lubricant monitoring chamber, before the laser oscillating section is activated, and judging that, when the lubricant detecting section does not detect the presence, the lubricant stored in the lubricant storage chamber is in a state immediately after a lubricant change.

13 Claims, 10 Drawing Sheets

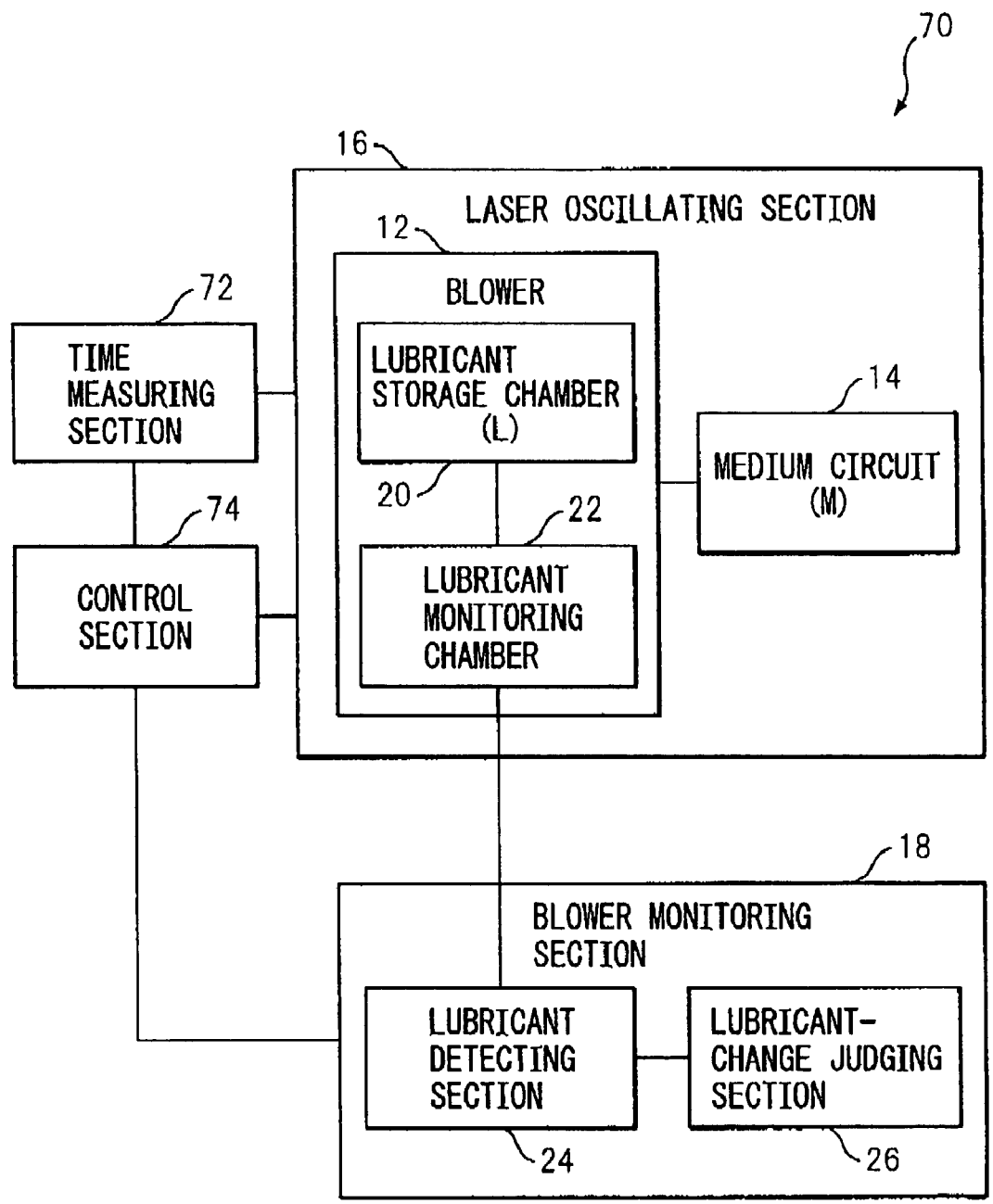

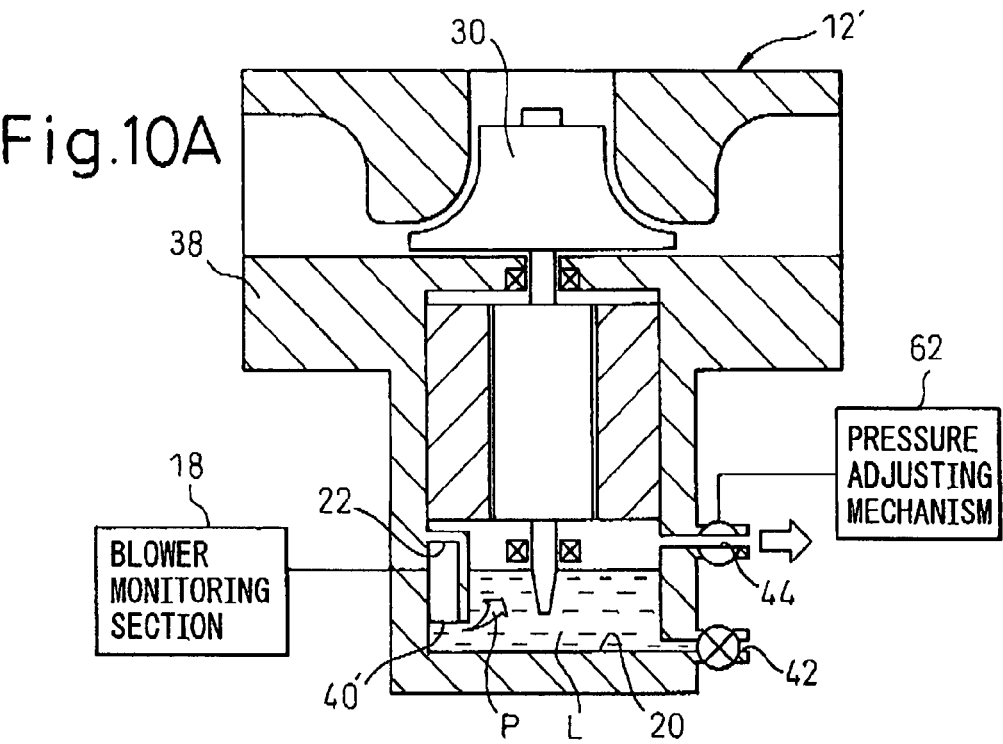
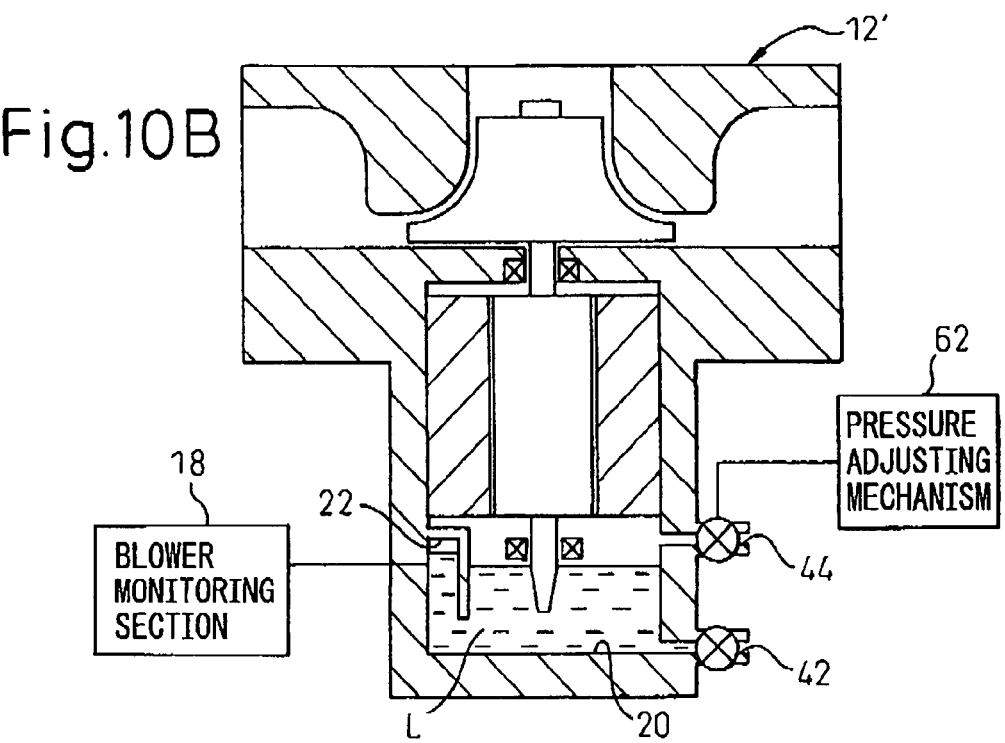

GAS LASER APPARATUS, AND METHOD AND DEVICE FOR MONITORING BLOWER

BACKGROUND OF THE INVENTION

1. Field of the Invention

The present invention relates to a gas laser apparatus using a gaseous laser medium. The present invention also relates to a method and device for monitoring a maintenance state of a blower adapted to be provided in a gas laser apparatus.

2. Description of the Related Art

A gas laser apparatuses using a gaseous laser medium is widely used in the field of processing, medical care, measurement and so on. A laser oscillating section of the gas laser apparatus generally includes an excitation section for exciting, by electrical discharge, light, heat, chemical reaction and the like, a flowable gas acting as a laser medium (referred to as a medium gas in this application); a light resonance section, having a pair of mirrors, for amplifying light energy of the medium gas excited by the excitation section and generating a laser beam; and a blower for forcibly circulating the medium gas in a medium circuit including the excitation section and the light resonance section.

In order to improve the characteristics or quality of the generated laser beam under given dimensional limitations of the gas laser apparatus, it is required that the blower provided in the gas laser apparatus for circulating the medium gas can achieve large capacity and high-speed rotation. Moreover, the blower of this type is exposed to high temperature when the laser beam is generated, and therefore, a lubricant or lubricating oil, supplied to a bearing section of an impeller, is likely to be degraded in quality. Thus, the lubricant or lubricating oil, contained in the blower, has to be periodically changed. However, when the maintenance/inspection time of the lubricant is managed manually by an operator, human errors such as oversight of the inspection time may occur. In order to solve this problem, as described in, for example, Japanese Patent No. 2622424 (JP-2622424-B2), a gas laser apparatus that can automatically manage maintenance and inspection time has been proposed.

The gas laser apparatus described in JP-2622424-B 2 includes a maintenance-time monitoring device for automatically managing maintenance and inspection time with regard to various items to be maintained, such as lubricant change in a blower, by monitoring an operating time of an object to be maintained. The maintenance-time monitoring device includes time-measuring means for measuring the operating time of the object to be maintained (e.g., a blower); time-limit alarm means for outputting an alarm signal at an instant when a measured operating time reaches a predetermined time; maintenance-time display controlling means for controlling a display unit so as to display the arrival of a maintenance time (e.g., a lubricant changing time) in response to the output of the alarm signal; and resetting means for resetting a time measurement performed by the time-measuring means and canceling a display instruction issued by the maintenance-time display controlling means, according to a signal indicating that the maintenance operation (e.g., a lubricant change) has been performed. In this connection, a signal issued by a limit switch, incorporated into a cap for closing a lubricant inlet of the blower, upon detecting the detachment or attachment of the cap, is given to the resetting means, which is a signal indicating that, for example, a lubricant or lubricating oil in a blower has been changed.

In the maintenance-time monitoring device of the gas laser apparatus, described in JP-2622424-B2, the cap detachment/attachment detecting signal issued from the limit switch incorporated into the cap of the lubricant inlet of the blower is adopted as the signal indicating that the lubricant in the blower has been changed. However, the lubricant in the blower is typically changed while the gas laser apparatus is de-energized in view of safety. In this connection, the maintenance-time monitoring device is incorporated into a control section for controlling the exciting and resonating operation of the medium gas in the gas laser apparatus, and therefore, in a state where the gas laser apparatus is de-energized, it is difficult to determine by a predetermined signal, whether the lubricant in the blower has been changed or not. In this regard, JP-2622424-B2 teaches a technique in which a signal indicating that the lubricant in the blower has been changed is manually input by, for example, a keyboard. In this technique, after the lubricant change is completed and the gas laser apparatus is energized, an operator uses the keyboard to input a lubricant-change completion signal, and thereby the resetting means of the maintenance-time monitoring device resets the time measurement performed by the time-measuring means and cancels the display instructions issued by the maintenance-time display controlling means.

When the technique for manually inputting the lubricant-change completion signal is adopted, burden on the operator may be increased, erroneous instructions by the operator may happen, and as a result, an unintended reset operation (i.e., initialization of management data) may take place. Further, when the lubricant in the blower is changed, since an internal space of the medium circuit of the gas laser apparatus is exposed to environmental air, impurities or foreign matter, other than the medium gas, may enter the excitation section or the light resonance section, and as a result, the hermetical feature of the medium circuit may be impaired. Therefore, after the lubricant is changed, an operation for checking the leakage of the medium gas in the medium circuit (so-called, a leak-checking) and/or removing foreign matter that have entered the medium circuit (so-called, an aging) are typically performed. In this regard, if the above described conventional maintenance-time monitoring device is used, the operator manually inputs, for convenience, instructions for the gas laser apparatus to perform leak-checking or aging, after the operator has manually input the lubricant-change completion signal. As a result, burden on the operator may be significantly increased, and the frequency of erroneous instructions by the operator may be increased.

SUMMARY OF THE INVENTION

It is an object of the present invention to provide a gas laser apparatus using a gaseous laser medium, which can automatically manage the time when lubricant or lubricating oil in a blower needs to be changed, and can automatically perform an initialization of management data after the lubricant is changed, and thus can significantly reduce burden on an operator so as to effectively eliminate a risk of erroneous instructions, so that the gas laser apparatus can establish stable operation for a long time It is another object of the present invention to provide a method and device for monitoring a maintenance state of a blower adapted to be provided in a gas laser apparatus, which can automatically manage the time when lubricant or lubricating oil in a blower needs to be changed, and can automatically perform an initialization of management data after the lubricant is change, and thus can significantly reduce burden on an operator so as to effectively eliminate a risk of erroneous input.

To accomplish the above object, the present invention provides, as one aspect of the invention, a gas laser apparatus comprising a laser oscillating section including a blower forcibly circulating a medium gas in a medium circuit; and a blower monitoring section monitoring a maintenance state of the blower; the blower comprising a lubricant storage chamber storing a lubricant; and a lubricant monitoring chamber connected to the lubricant storage chamber to ensure fluidic communication therebetween at a position lower than an oil level of a lubricant having a predetermined appropriate volume and stored in the lubricant storage chamber; the blower monitoring section comprising a lubricant detecting section detecting that a lubricant stored in the lubricant storage chamber of the blower flows into the lubricant monitoring chamber and at least a part of the lubricant is present in the lubricant monitoring chamber, as a result of internal-pressure change in the lubricant storage chamber; and a lubricant-change judging section monitoring whether the lubricant detecting section detects a presence of the lubricant in the lubricant monitoring chamber, before the laser oscillating section is activated, and judging that, when the lubricant detecting section does not detect the presence, the lubricant stored in the lubricant storage chamber is in a state immediately after a lubricant change.

In a preferred embodiment, the gas laser apparatus may further comprise a control section controlling an operation of the laser oscillating section, and a pressure adjusting mechanism adjusting an internal pressure of the lubricant storage chamber of the blower in a manner as to accompany a preliminary operation for each of activation and deactivation of the laser oscillating section; wherein the control section controls an internal-pressure adjusting operation for the lubricant storage chamber performed by the pressure adjusting mechanism, simultaneously with an execution of adjustment of an internal-pressure of the medium circuit as the preliminary operation.

Also, the gas laser apparatus may further comprise a control section controlling an operation of the laser oscillating section, and a time measuring section measuring an actual operating time of the laser oscillating section after the lubricant stored in the lubricant storage chamber of the blower is changed; wherein the control section controls an operation of the laser oscillating section based on the actual operating time measured by the time measuring section and a judging result of the lubricant-change judging section of the blower monitoring section.

In a case where the blower includes a casing defining the lubricant storage chamber and the lubricant monitoring chamber, the lubricant monitoring chamber may be defined by an airtight wall portion locally protruding outside the casing, or alternatively, by an airtight wall portion locally extending inside the casing.

The present invention also provides, as another aspect of the invention, a blower monitoring method for monitoring a maintenance state of a blower, comprising providing the blower with a lubricant storage chamber storing a lubricant and a lubricant monitoring chamber connected to the lubricant storage chamber to ensure fluidic communication therebetween at a position lower than an oil level of a lubricant having a predetermined appropriate volume and stored in the lubricant storage chamber; detecting that a lubricant stored in the lubricant storage chamber of the blower flows into the lubricant monitoring chamber and at least a part of the lubricant is present in the lubricant monitoring chamber, as a result of internal-pressure change in the lubricant storage chamber; and monitoring whether a presence of the lubricant in the lubricant monitoring chamber is detected, and judging that, when the presence is not detected, the lubricant stored in the lubricant storage chamber is in a state immediately after a lubricant change.

The present invention also provides, as a further aspect of the invention, a blower monitoring device for monitoring a maintenance state of a blower, the blower comprising a lubricant storage chamber storing a lubricant; and a lubricant monitoring chamber connected to the lubricant storage chamber to ensure fluidic communication therebetween at a position lower than an oil level of a lubricant having a predetermined appropriate volume and stored in the lubricant storage chamber; the blower monitoring device comprising a lubricant detecting section detecting that a lubricant stored in the lubricant storage chamber of the blower flows into the lubricant monitoring chamber and at least a part of the lubricant is present in the lubricant monitoring chamber, as a result of internal-pressure change in the lubricant storage chamber; and a lubricant-change judging section monitoring whether the lubricant detecting section detects a presence of the lubricant in the lubricant monitoring chamber and judging that, when the lubricant detecting section does not detect the presence, the lubricant stored in the lubricant storage chamber is in a state immediately after a lubricant change.

BRIEF DESCRIPTION OF THE DRAWINGS

The above and other objects, features and advantages of the present invention will become more apparent from the following description of preferred embodiments in connection with the accompanying drawings, wherein:

FIG. 5 is a functional block diagram showing a configuration of a gas laser apparatus according to a second developed embodiment of the present invention;

FIGS. 6A and 6B are illustrations showing a configuration of a blower provided in the gas laser apparatus of FIGS. 4 and 5, in such a manner as to follow a state transition during an operation for changing a lubricant, wherein FIG. 6A shows a state in which an old lubricant is drained and FIG. 6B shows a state in which a new lubricant is supplied;

FIGS. 7A and 7B are illustrations showing a configuration of a blower provided in the gas laser apparatus of FIGS. 4 and 5, in such a manner as to follow a state transition during an operation for changing a lubricant, wherein FIG. 7A shows a state in which pressure in a lubricant storage chamber is reduced and FIG. 7B shows a state in which the pressure in the lubricant storage chamber is increased;

FIGS. 9A and 9B are illustrations showing a configuration of a modification of a blower provided in the gas laser apparatus of FIGS. 4 and 5, in such a manner as to follow a state transition during an operation for changing a lubricant, wherein FIG. 9A shows a state in which an old lubricant is drained and FIG. 9B shows a state in which a new lubricant is supplied; and FIGS. 10A and 10B are illustrations showing a configuration of a modification of a blower provided in the gas laser apparatus of FIGS. 4 and 5, in such a manner as to follow a state transition during an operation for changing a lubricant, wherein FIG. 10A shows a state in which pressure in a lubricant storage chamber is reduced and FIG. 10B shows a state in which the pressure in the lubricant storage chamber is increased.

DETAILED DESCRIPTION

Figure 1:
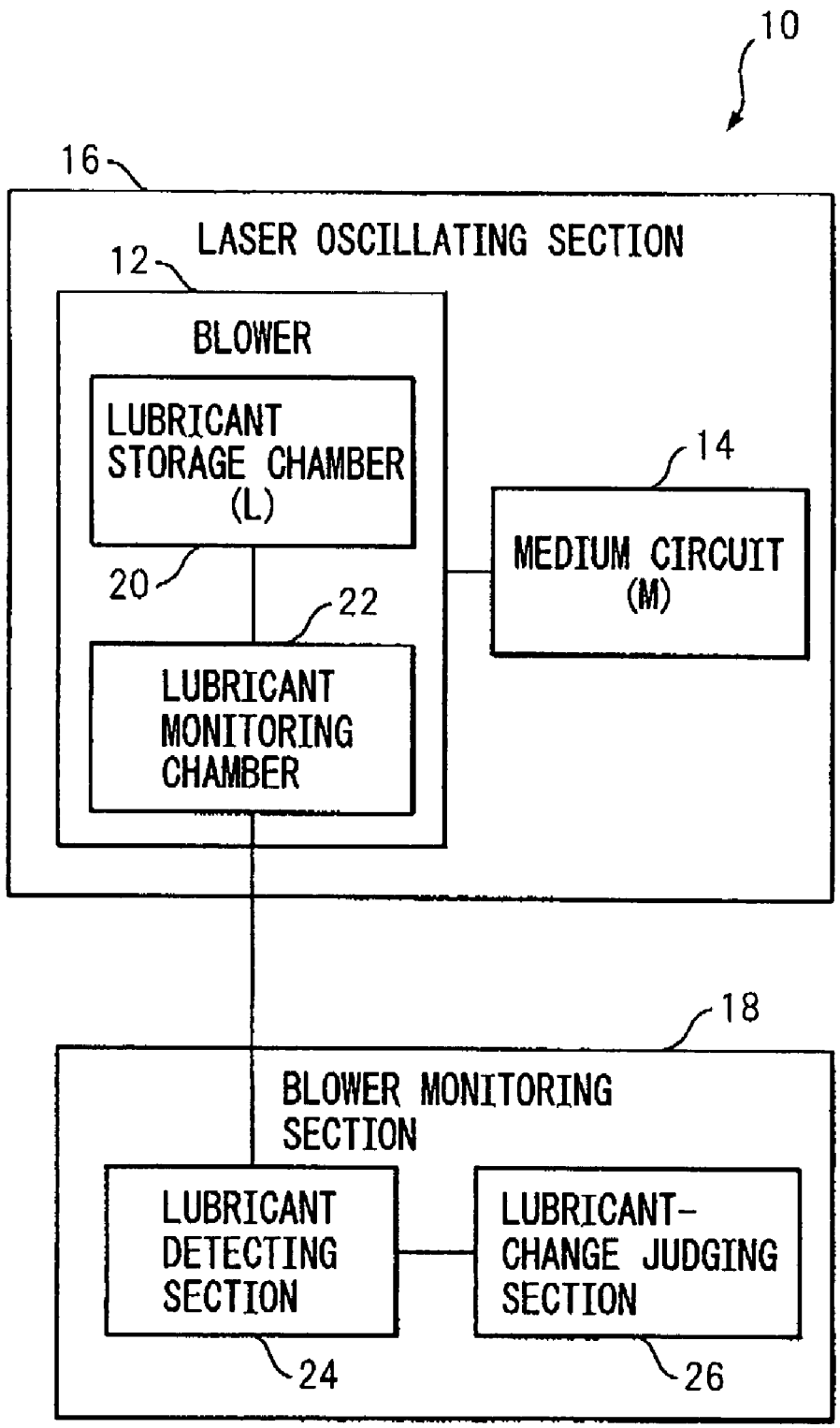
FIG. 1 is a functional block diagram showing a basic configuration of a gas laser apparatus according to the present invention.

The embodiments of the present invention are described below, in detail, with reference to the accompanying drawings. In the drawings, same or similar components are denoted by common reference numerals.

Figure 2:
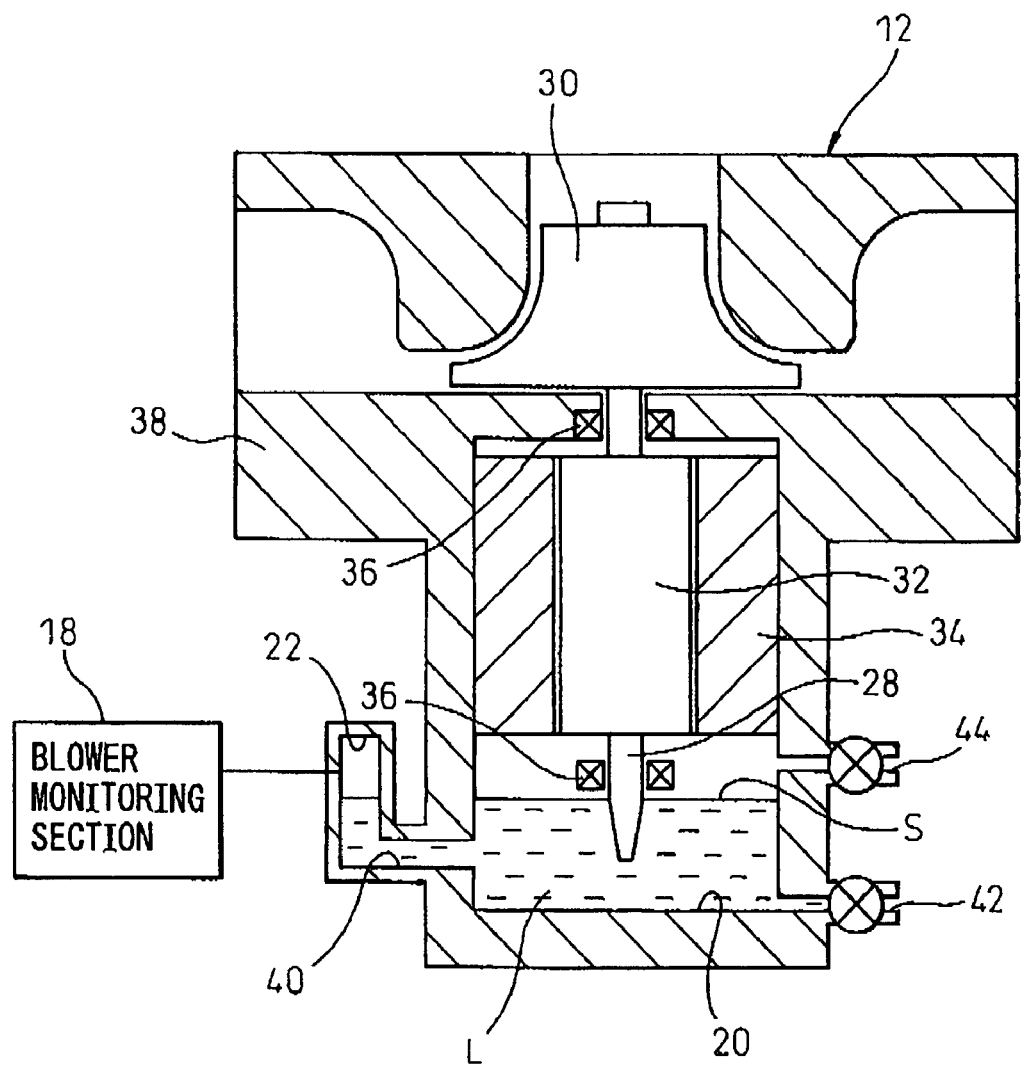
FIG. 2 is an illustration schematically showing an example of a configuration of a blower provided in the gas laser apparatus of FIG. 1.

Referring to the drawings, FIG. 1 is a functional block diagram showing a basic configuration of a gas laser apparatus 10 according to the present invention, and FIG. 2 is an illustration schematically showing an example of a configuration of a blower 12 provided in the gas laser apparatus 10. The gas laser apparatus 10 includes a laser oscillating section 16 having a medium circuit 14 for generating a laser beam and including a blower 12 for forcibly circulating a medium gas M in the medium circuit 14; and a blower monitoring section 18 for monitoring a maintenance state (in particular, a lubricant changing state) of the blower 12 of the laser oscillating section 16. The blower 12 includes a lubricant storage chamber 20 for storing a lubricant or lubricating oil L; and a lubricant monitoring chamber 22 connected to the lubricant storage chamber 20 to ensure fluidic communication therebetween at a position lower than an oil level S of a lubricant or lubricating oil L having a predetermined appropriate volume and stored in the lubricant storage chamber 20. The blower monitoring section 18 includes a lubricant detecting section 24 for detecting that a lubricant or lubricating oil L stored in the lubricant storage chamber 20 of the blower 12 flows into the lubricant monitoring chamber 22 and at least a part of the lubricant L is present in the lubricant monitoring chamber 22, as a result of internal-pressure change in the lubricant storage chamber 20; and a lubricant-change judging section 26 for monitoring whether the lubricant detecting section 24 detects a presence of the lubricant L in the lubricant monitoring chamber 22, before the laser oscillating section 16 is activated, and judging that, when the lubricant detecting section 24 does not detect the presence of the lubricant L, the lubricant L stored in the lubricant storage chamber 20 is in a state immediately after a lubricant change or renewal.

The blower 12 shown in FIG. 2 is configured, by way of example, as a direct-drive turbofan, and includes an impeller 30 having a shaft 28; an electric motor rotor 32 directly coupled with the shaft 28; an electric motor stator 34 surrounding the rotor 32 via a gap; and a casing 38 rotatably supporting the shaft 28 through a pair of bearings 36 and fixedly supporting the stator 34. The casing 38 defines the lubricant storage chamber 20 and the lubricant monitoring chamber 22, in a space adjacent to the rotor 32 and the stator 34. The lubricant storage chamber 20 and the lubricant monitoring chamber 22 are communicated with each other through a passage 40 having a certain diameter, which opens at the bottom end of the lubricant monitoring chamber 22 as seen in the direction of gravity, when the blower 12 is disposed in a normal upright orientation (i.e., in the illustrated orientation in which the impeller 30 is directed upward) on a stationary surface. In this connection, the lubricant monitoring chamber 22 is defined in the casing 38 as a hermetically closed space that has no opening permitting fluid to flow, other than the opening to the passage 40. The casing 38 is further provided with an oil outlet 42 and an air outlet 44 formed to individually open to the lubricant storage chamber 20, each of the outlets 42, 44 being equipped with a cock or valve capable of opening and closing. In the blower 12, an appropriate volume of the lubricant L is stored in the lubricant storage chamber 20, so that the lubricant L can be stably supplied to the pair of bearings 36 during the rotation of the impeller 30.

When a degraded lubricant L is replaced by a new lubricant L, the oil outlet 42 is opened to expel the old degraded lubricant L, and thereafter the oil outlet 42 is closed and the new lubricant L is poured or supplied through an oil inlet (not shown) into the lubricant storage chamber 20. To ensure safety, this changing operation of the lubricant L is performed in a state in which the gas laser apparatus 10 is de-energized or turned off, and the internal pressure of both the lubricant storage chamber 20 and the lubricant monitoring chamber 22 is maintained at atmospheric pressure. In order to activate the gas laser apparatus 10 after completing the changing operation of the lubricant L, after the gas laser apparatus 10 is energized or turned-on, the internal pressure of the medium circuit 14 of the laser oscillating section 16 is reduced, as a preliminary operation immediately after an activation switch (not shown) provided separately is turned on, and, at the same time, the air outlet 44 is opened and the air is expelled by a pump and the like (not shown) to reduce the pressure in the lubricant storage chamber 20. During the operation of the gas laser apparatus 10, the internal pressure of the medium circuit 14 of the laser oscillating section 16 and the internal pressure of the lubricant storage chamber 20 of the blower 12 are maintained at a reduced pressure.

The lubricant detecting section 24 of the blower monitoring section 18 may have various configurations for liquid detection, such as a configuration in which the lubricant monitoring chamber 22 having a transparent wall surface is irradiated with light and the quantity of the light received after reflection, refraction and transmission is measured so as to detect the presence (or, e.g., the oil level) of the lubricant L; a configuration in which the lubricant monitoring chamber 22 is photographed so as to detect the presence (or, e.g., the oil level) of the lubricant L by image processing; a configuration in which the lubricant monitoring chamber 22 is irradiated with ultrasonic waves so as to detect the presence (or, e.g., the oil level) of the lubricant L; a configuration in which the lubricant monitoring chamber 22 is provided with a thermistor so as to detect the presence of the lubricant L by monitoring change in electrical resistance or measured temperature; a configuration in which a local vibration is applied to the lubricant monitoring chamber 22 so as to detect the presence of the lubricant L by monitoring change in the vibration; and so on. Further, the lubricant-change judging section 26 of the blower monitoring section 18 may be incorporated, for example, as software into a controller (not shown) equipped in the gas laser apparatus 10 for controlling an operation concerning the generation of the laser beam in the laser oscillating section 16.

In the operation for changing the lubricant in the blower 12 in the gas laser apparatus 10 configured as described above, when the blower 12 is disposed in a normal upright position and the old lubricant L is completely drained from the lubricant storage chamber 20 and thereafter the new lubricant L is poured or supplied into the lubricant storage chamber 20, the opening area of the lubricant monitoring chamber 22 is closed by the lubricant L at an instant when the passage 40 is filled with the lubricant L because both the lubricant storage chamber 20 and the lubricant monitoring chamber 22 are maintained at atmospheric pressure, and consequently, even when the appropriate volume of the lubricant L is supplied into the lubricant storage chamber 20, the lubricant L is not substantially present in the lubricant monitoring chamber 22. In this state, when the gas laser apparatus 10 is activated for the first time after the lubricant changing operation for the blower 12, the pressure in the medium circuit 14 of the laser oscillating section 16 and the pressure in the lubricant storage chamber 20 are simultaneously reduced, as the above described preliminary operation, and therefore a certain amount or volume of air hermetically enclosed in the lubricant monitoring chamber 22 is transferred to the lubricant storage chamber 20 through the passage 40. As a result, a certain amount or volume of the lubricant L, corresponding to the air transferred to the lubricant storage chamber 20, flows into the lubricant monitoring chamber 22 from the lubricant storage chamber 20.

In the gas laser apparatus 10, in relation to the blower 12 having the above structural features, the blower monitoring section 18 starts to operate, immediately after the activation switch of the gas laser apparatus 10 is turned on and before the above described preliminary operation for activation is started, so as to check by the lubricant detecting section 24 whether the lubricant L is present in the lubricant monitoring chamber 22. The lubricant L present in the lubricant monitoring chamber 22 at this time is one that has flowed into the lubricant monitoring chamber 22 from the lubricant storage chamber 20 as a result of the internal pressure change in the lubricant storage chamber 20 (i.e., as a result of the above described preliminary operation), and therefore, the lubricant-change judging section 26 can judge that, when the lubricant detecting section 24 does not detect the presence of the lubricant L in the lubricant monitoring chamber 22, the lubricant L stored in the lubricant storage chamber 20 is in a state immediately after the lubricant change (i.e., the lubricant L has never been subjected to the operation of the gas laser apparatus 10). On the other hand, if the lubricant detecting section 24 detects at this time the presence of the lubricant L in the lubricant monitoring chamber 22, the lubricant-change judging section 26 judges that the lubricant L stored in the lubricant storage chamber 20 is not in a state immediately after the lubricant change but has been subjected at least one time to the operation of the gas laser apparatus 10.

As described above, according to the gas laser apparatus 10, the blower monitoring section 18 can automatically judge whether the lubricant L in the blower 12 is in a state immediately after the lubricant change, by monitoring the presence of the lubricant L in the lubricant monitoring chamber 22, and therefore, it is possible to automatically manage a lubricant change time without requiring an operator's manual work. Moreover, the judgment by the blower monitoring section 18 is automatically performed immediately after the activation switch of the gas laser apparatus 10 is turned on without depending on the instruction of an operator, and therefore, burden on the operator is reduced and a risk of erroneous instructions by the operator is effectively eliminated. Therefore, in the gas laser apparatus 10, it is possible for the operator to perform the lubricant changing operation indispensable for the maintenance of the blower 12 at suitable times (e.g., periodically), and as a result, the gas laser apparatus 10 can operate stably for a long period of time.

In the configuration described above, when the blower 12 is in the state immediately after the lubricant change, a small amount or volume of the lubricant L may flow into the lubricant monitoring chamber 22 from the lubricant storage chamber 20 due to any reason other than the above described preliminary operation for activation of the laser oscillating section 16. In this case, the blower monitoring section 18 may mistakenly judge that the lubricant L has flowed into the lubricant monitoring chamber 22 from the lubricant storage chamber 20 as a result of the preliminary operation. Thus, it is desirable to previously set a threshold value (or a margin value) of the volume of the lubricant L accommodated in the lubricant monitoring chamber 22, so that the lubricant-change judging section 26 judges that the blower 12 is in the state immediately after the change of the lubricant L when the lubricant detecting section 24 does not detect the presence of the lubricant L in a volume exceeding the threshold value in the lubricant monitoring chamber 22.

Figure 3:
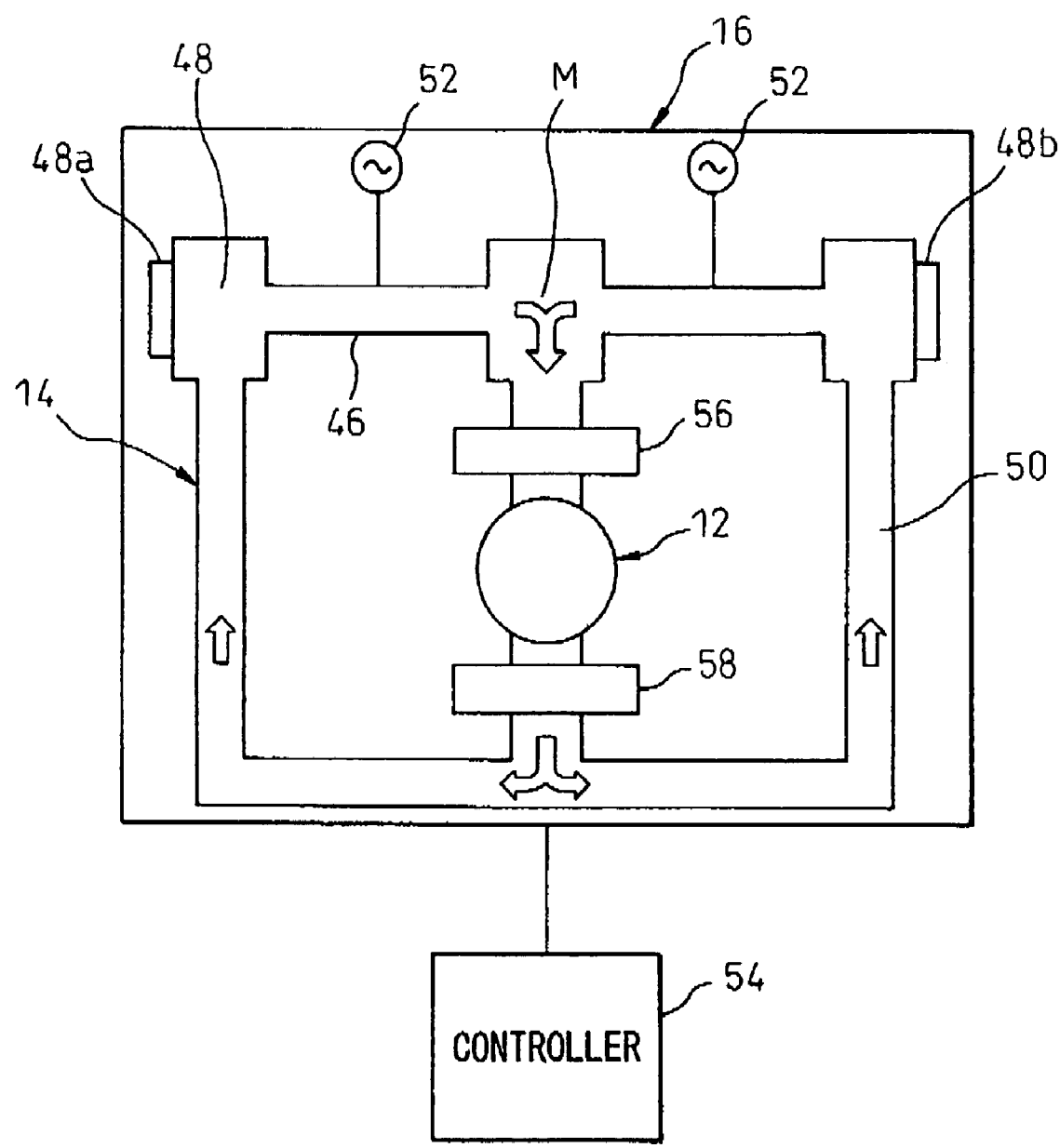
FIG. 3 is an illustration schematically showing an example of a configuration of a laser oscillating section of the gas laser apparatus of FIG. 1.

FIG. 3 schematically shows an exemplary configuration of the laser oscillating section 16 of the gas laser apparatus 10. The illustrated laser oscillating section 16 includes an excitation section 46 for exciting the medium gas M; a light resonance section 48 for amplifying light energy of the medium gas M excited by the excitation section 46 and emitting the amplified light energy as a laser beam; a circulation path 50 connected with the excitation section 46 and the light resonance section 48 to form the medium circuit 14 in which the medium gas M flows under pressure; and the blower 12 disposed in the circulation path 50 to forcibly circulate the medium gas M at high speed in the medium circuit 14. The excitation section 46 is formed as an electric discharge tube having a pair of electrodes (not shown) connected to a pair of excitation power supplies 52. A rear mirror (i.e., a total reflection mirror or a partial transmission mirror) 48a and an output mirror (i.e., a partial transmission mirror) 48b, which constitute the light resonance section 48, are fixedly disposed at opposite axial ends of the excitation section 46.

The pair of excitation power supplies 52 of the excitation section 46 apply AC voltage in a radio frequency area to the corresponding electrodes. This typical oscillation operation is activated through a sequence control performed by a controller 54 connected to the laser oscillating section 16. When the excitation power supplies 52 are activated to cause electrical discharge and thereby the medium gas M within the excitation section 46 is excited and the energy thereof is amplified in the light resonance section 48, a laser beam is emitted from the output mirror 48b. The medium gas M in the excitation section 46, having high temperature due to the electrical discharge, is cooled by a heat exchanger 56 disposed upstream of the blower 12 and thereafter inhaled by the blower 12. The blower 12 urges the medium gas M under pressure toward a discharge side. The medium gas M, the temperature of which rises in this compression process, is cooled again by another heat exchanger 58 disposed downstream of the blower 12. The medium gas M discharged from the blower 12 and thus cooled flows through the circulation path 50, so as to be supplied to the excitation section 46.

Figure 4:
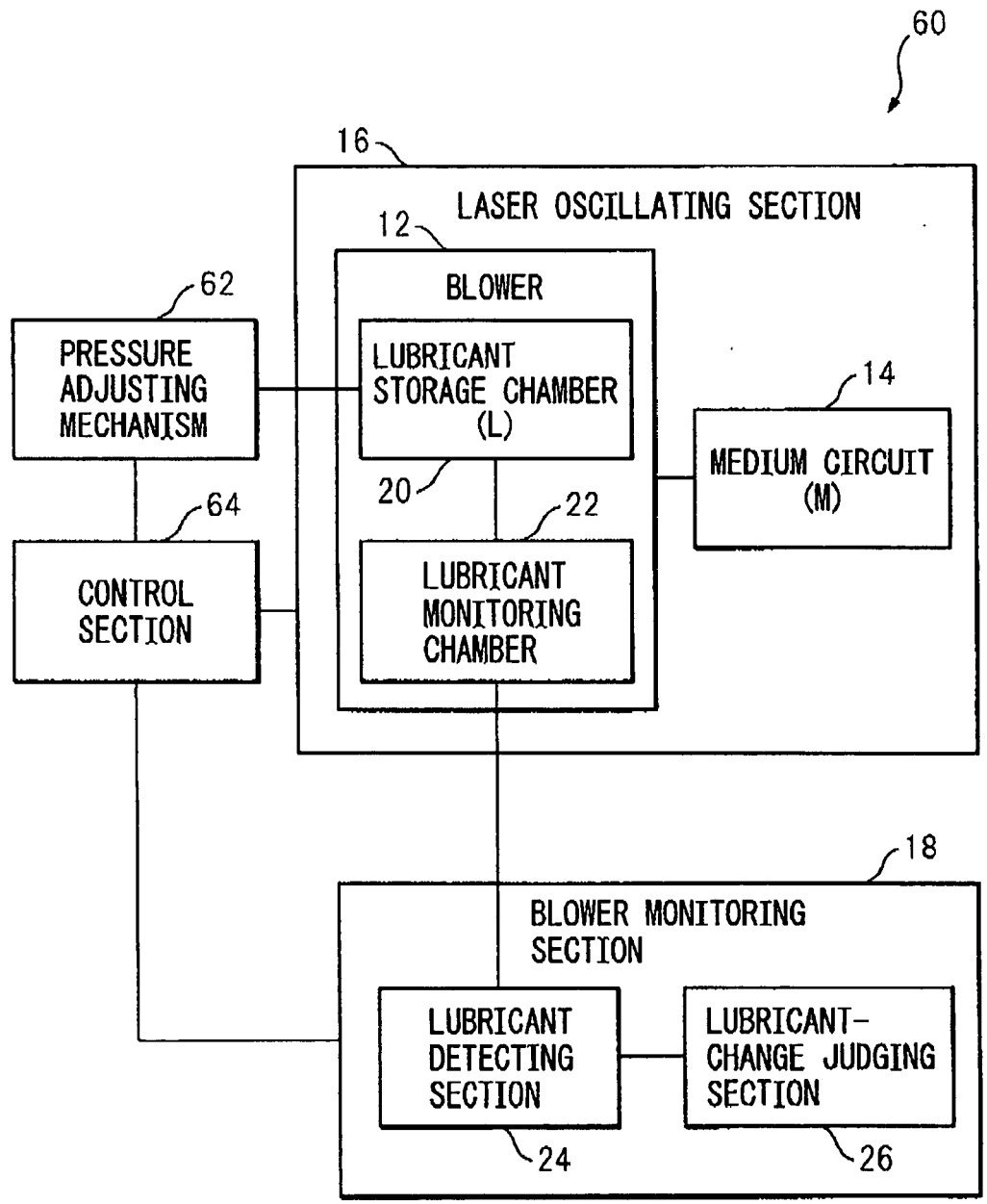
FIG. 4 is a functional block diagram showing a configuration of a gas laser apparatus according to a first developed embodiment of the present invention.

FIG. 4 is a functional block diagram showing a configuration of a gas laser apparatus 60 according to a first developed embodiment of the present invention. The gas laser apparatus 60 has a basic configuration of the gas laser apparatus 10 shown in FIG. 1, and therefore, corresponding components are denoted by like reference numerals, and the descriptions thereof are not repeated.

The gas laser apparatus 60 further includes a pressure adjusting mechanism 62 for adjusting the internal pressure of the lubricant storage chamber 20 of the blower 12 in a manner as to accompany respective preliminary operations for activation and deactivation of the laser oscillating section 16. According to this configuration, it is possible to automatically perform the operation for simultaneously reducing the pressure in the medium circuit 14 of the laser oscillating section 16 and the pressure in the lubricant storage chamber 20, as the above described preliminary operation for activation of the gas laser apparatus 10, by the pressure adjusting mechanism (e.g., a pump, a switching valve, etc.) 62 inherently provided in the gas laser apparatus 60. On the other hand, when deactivating the gas laser apparatus 10, the internal pressure of the medium circuit 14 of the laser oscillating section 16 is increased, as a preliminary operation for deactivation immediately after a deactivation switch (not shown) is turned on, and, at the same time, the air outlet 44 of the blower 12 is opened to increase the pressure in the lubrication storage chamber 20 to atmospheric pressure. This preliminary operation for deactivation can also be automatically performed by the pressure adjusting mechanism 62 inherently provided in the gas laser apparatus 60.

In the configuration described above, in the case where the gas laser apparatus 60 includes a control section 64 (e.g., the controller 54 shown in FIG. 3) for controlling the operation of the laser oscillating section 16, the control section 64 can control the operation of the pressure adjusting mechanism 62 for adjusting the internal pressure of the lubricant storage chamber 20, simultaneously with the execution of adjustment of the internal pressure of the medium circuit 14 as the above described preliminary operation. According to this arrangement, the control section 64 can simultaneously control the activation and deactivation of the laser oscillating section 16 and the reduction and increase of the pressure in the lubricant storage chamber 20 of the blower 12 in response to a single program, and thereby an operation and a management system in the gas laser apparatus 60 can be readily automated. In this connection, it is advantageous to configure the control section 64 so as to also control the operation of the blower monitoring section 18 (i.e., the detecting operation by the lubricant detecting section 24 and the judging operation by the lubricant-change judging section 26).

FIG. 5 is a functional block diagram showing a configuration of a gas laser apparatus 70 according to a second developed embodiment of the present invention. The gas laser apparatus 70 has a basic configuration of the gas laser apparatus 10 shown in FIG. 1, and therefore, corresponding components are denoted by like reference numerals, and the descriptions thereof are not repeated.

The gas laser apparatus 70 further includes a time measuring section 72 for measuring an actual operating time of the laser oscillating section 16 after the lubricant L stored in the lubricant storage chamber 20 of the blower 12 is changed. According to this configuration, when the lubricant-change judging section 26 of the blower monitoring section 18 judges that the lubricant L stored in the lubricant storage chamber 20 is not in a state immediately after the change, it is possible to predict to what extent the lubricant has been subjected to the operation of the gas laser apparatus 10, on the basis of the actual operating time measured by the time measuring section 72. Therefore, the changing of the lubricant L can be performed at a more appropriate time.

In the configuration described above, in the case where the gas laser apparatus 70 includes a control section 74 (e.g., the controller 54 shown in FIG. 3) for controlling the operation of the laser oscillating section 16, the control section 74 can control the operation of the laser oscillating section 16, based on the actual operating time measured by the time measuring section 72 and the judging result of the lubricant-change judging section 26 of the blower monitoring section 18. In this arrangement, the control section 74 also controls the operation of the blower monitoring section 18 (i.e., the detecting operation by the lubricant detecting section 24 and the judging operation by the lubricant-change judging section 26). According to this arrangement, the control section 74 can control the activation and deactivation of the laser oscillating section 16 depending on the degree of degradation of the lubricant L in the blower 12 in response to a single program, and thereby operation and management of the gas laser apparatus 70 can be automated.

In the gas laser apparatus 70, the control section 74 may be configured to compare the actual operating time of the laser oscillating section 16 measured by the time measuring section 72 with a predetermined threshold value, output an alarm signal when the actual operating time exceeds the threshold value, and, after the alarm signal is output, forcibly deactivate the operation of the laser oscillating section 16 when the lubricant-change judging section 26 judges that the lubricant L is not in a state immediately after the lubricant change. According to this arrangement, the time to change the lubricant L can be set in advance by the threshold value of the actual operating time of the laser oscillating section 16, and the fact that the lubricant change time arrives can be automatically detected to forcibly deactivate the laser oscillating section 16, so that it is possible to further improve the safety and maintenance reliability of the gas laser apparatus 70.

In the configuration described above, the control section 74 may be configured to automatically initialize (e.g., reset to zero) the actual operating time of the laser oscillating section 16 measured by the time measuring section 72, when the lubricant-change judging section 26 judges that the lubricant L is in a state immediately after the lubricant change. According to this arrangement, a subsequent lubricant change time can be managed with high reliability, without requiring operator's manual work. It should be noted that the embodiments shown in FIGS. 4 and 5 may be combined with each other, so that the pressure adjusting mechanism 62 and the time measuring section 72 can be controlled by the common control section 64 or 74.

In the gas laser apparatus 60, 70, the control section 64, 74 may be configured to allow the laser oscillating section 16 to automatically perform an operation for checking the leakage of the medium gas M in the medium circuit 14 (i.e., a leak-checking), when the lubricant-change judging section 26 judges that the lubricant L is in a state immediately after the lubricant change. Also, the control section 64, 74 may be configured to allow the laser oscillating section 16 to automatically perform an operation for removing foreign matter or impurities that have entered the medium circuit 14 (i.e., an aging), when the lubricant-change judging section 26 judges that the lubricant L is in a state immediately after the lubricant change. According to these configurations, the preparation operations (i.e., a leak-checking and an aging) indispensably performed, after the lubricant L is changed, to prepare the laser oscillating section 16 for activation can be automatically performed without depending on the instruction of the operator. As a result, burden on the operator can be significantly reduced and the frequency of erroneous instructions by the operator can also be reduced.

A method for monitoring (or for managing the maintenance time of) the blower 12 in the gas laser apparatus 60, 70 will be described in further detail, with reference to a state transition of the blower 12 shown in FIGS. 6A to 7B and a management flow chart shown in FIG. 8.

Figure 6A:
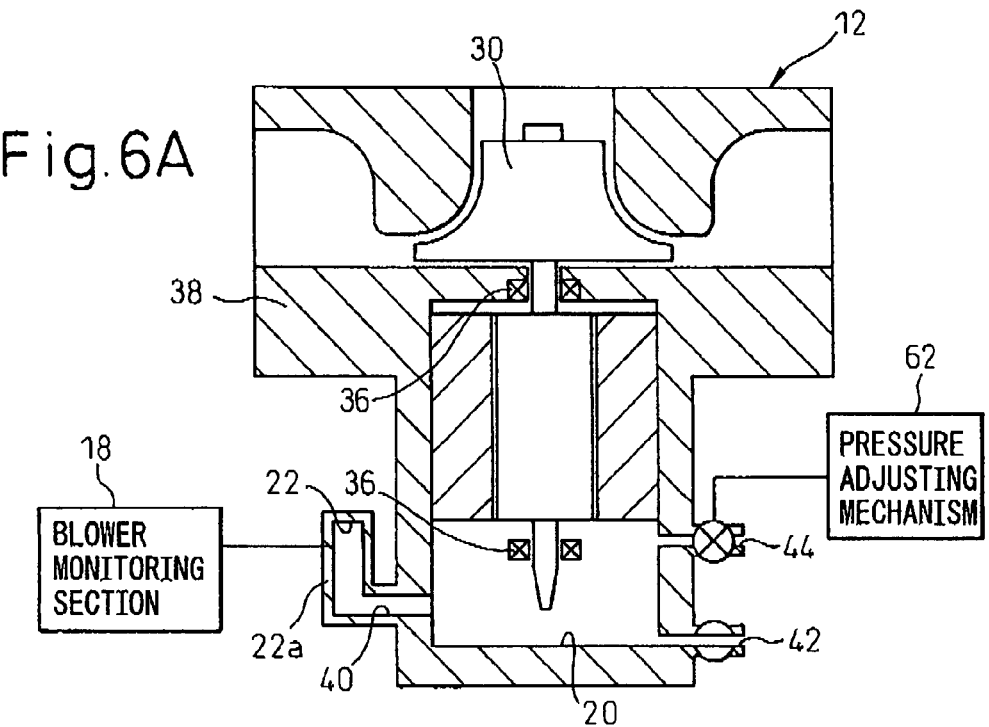
Figure 6B:
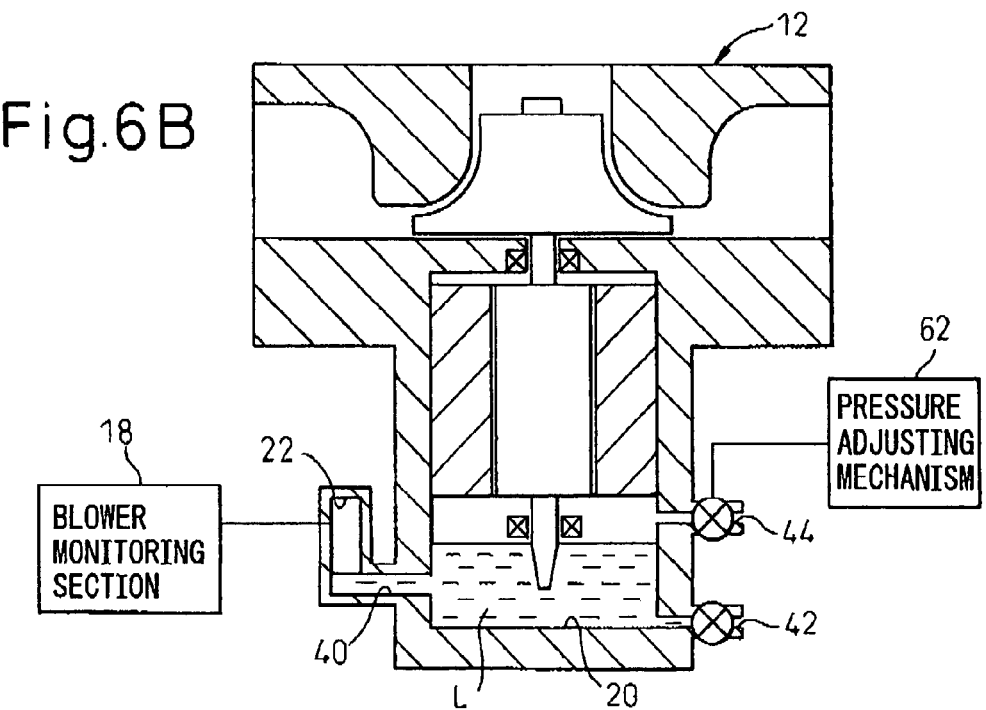

In the lubricant changing operation for the blower 12, first, the blower 12 is disposed in the normal upright orientation, and the oil outlet 42 is opened to completely drain the old lubricant from the lubricant storage chamber 20 (FIG. 6A). Next, the oil outlet 42 is closed, and an appropriate volume of the new lubricant L is poured or supplied through the lubricant inlet (not shown) into the lubricant storage chamber 20. At this stage, both the lubricant storage chamber 20 and the lubricant monitoring chamber 22 are maintained at atmospheric pressure, so that the opening area of the lubricant monitoring chamber 22 is closed by the lubricant L at an instant when the passage 40 is filled with the lubricant L, and consequently, when the appropriate volume of the lubricant L is supplied into the lubricant storage chamber 20, the lubricant monitoring chamber 22 is kept in a state where the lubricant L is not substantially present in the lubricant monitoring chamber 22 (FIG. 6B). Therefore, in this state, the lubricant detecting section 24 of the blower monitoring section 18 does not detect the presence of the lubricant L in the lubricant monitoring chamber 22, and therefore, the lubricant-change judging section 26 judges that the lubricant L stored in the lubricant storage chamber 20 is in the state immediately after the lubricant change.

Figure 7A:
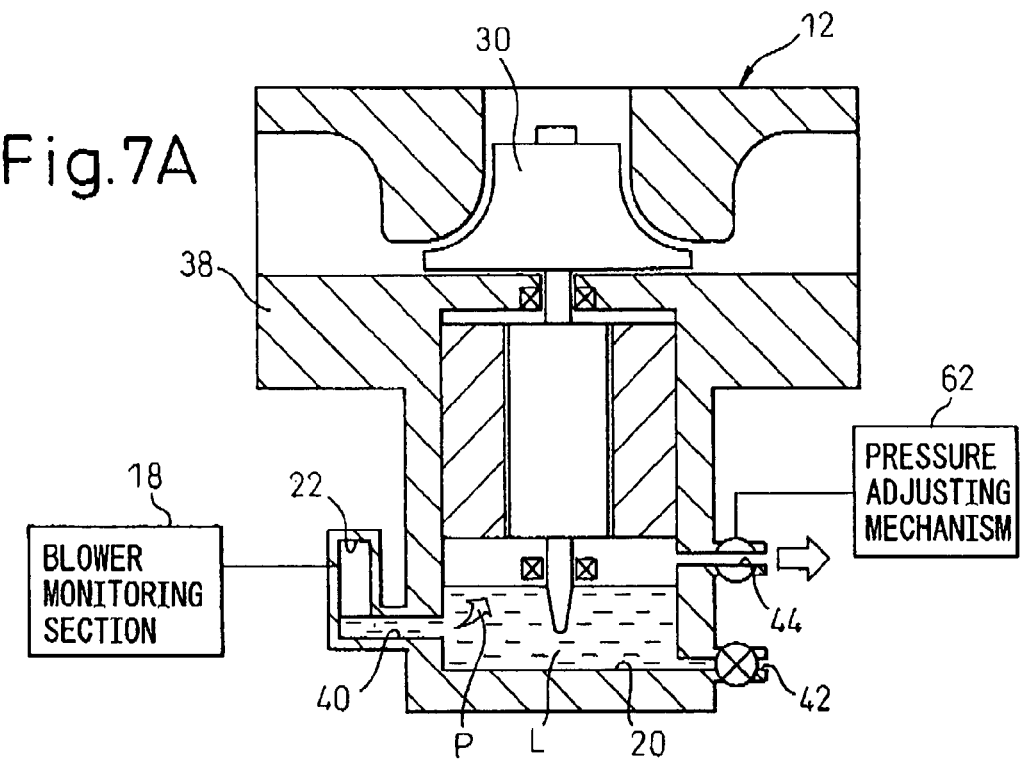
Figure 7B:
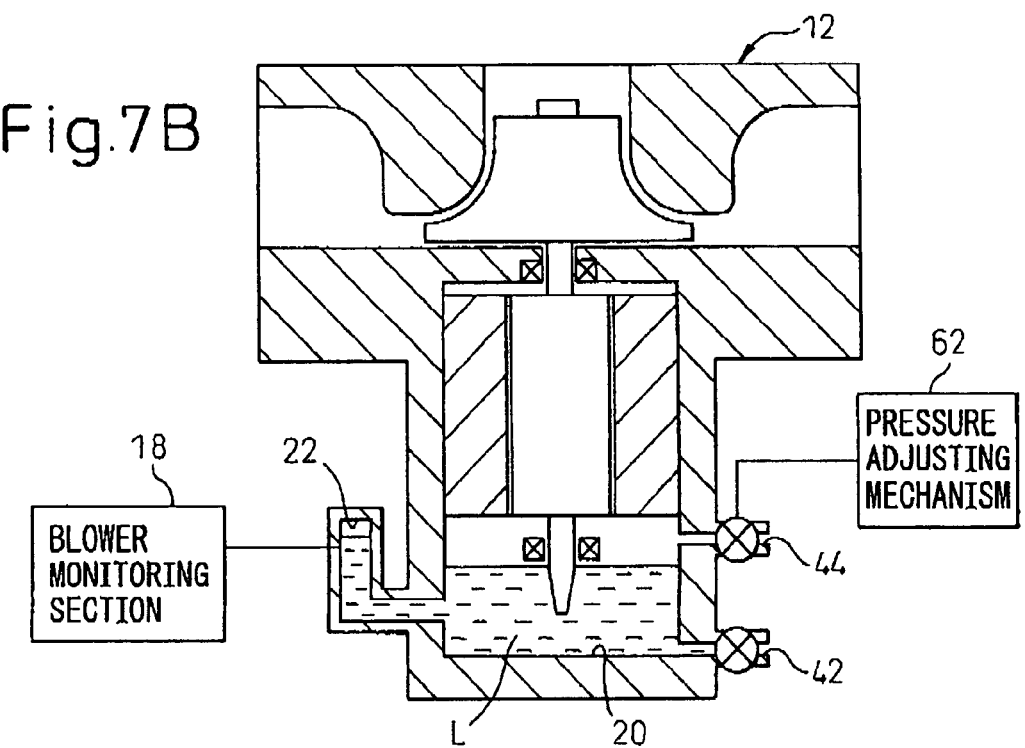

When the gas laser apparatus 10 is activated for the first time after the changing operation of the lubricant L in the blower 12 has been completed as described above, pressure in the lubricant storage chamber 20 is reduced by the pressure adjusting mechanism 62 simultaneously with the reduction of a pressure in the medium circuit 14 of the laser oscillating section 16, as the above described preliminary operation for activation. Thus, a certain amount or volume of the air P hermetically enclosed in the lubricant monitoring chamber 22 is transferred to the lubricant storage chamber 20 through the passage 40 (FIG. 7A). As a result, a certain amount or volume of the lubricant L, corresponding to the air P transferred to the lubricant storage chamber 20, flows into the lubricant monitoring chamber 22 from the lubricant storage chamber 20. When the gas laser apparatus 60, 70 is deactivated, after the gas laser apparatus 60, 70 operates, a pressure in the lubricant storage chamber 20 is increased to atmospheric pressure by the pressure adjusting mechanism 62 simultaneously with the increase of pressure in the medium circuit 14 of the laser oscillating section 16, as the above described preliminary operation for deactivation. Thereby, an additional volume of the lubricant L, corresponding to the pressure difference, also flows into the lubricant monitoring chamber 22 from the lubricant storage chamber 20 (FIG. 7B). Therefore, in this state, the lubricant detecting section 24 of the blower monitoring section 18 detects the presence of the lubricant L in the lubricant monitoring chamber 22, and therefore, the lubricant-change judging section 26 judges that the lubricant L stored in the lubricant storage chamber 20 is not in the state immediately after the lubricant change.

Figure 8:
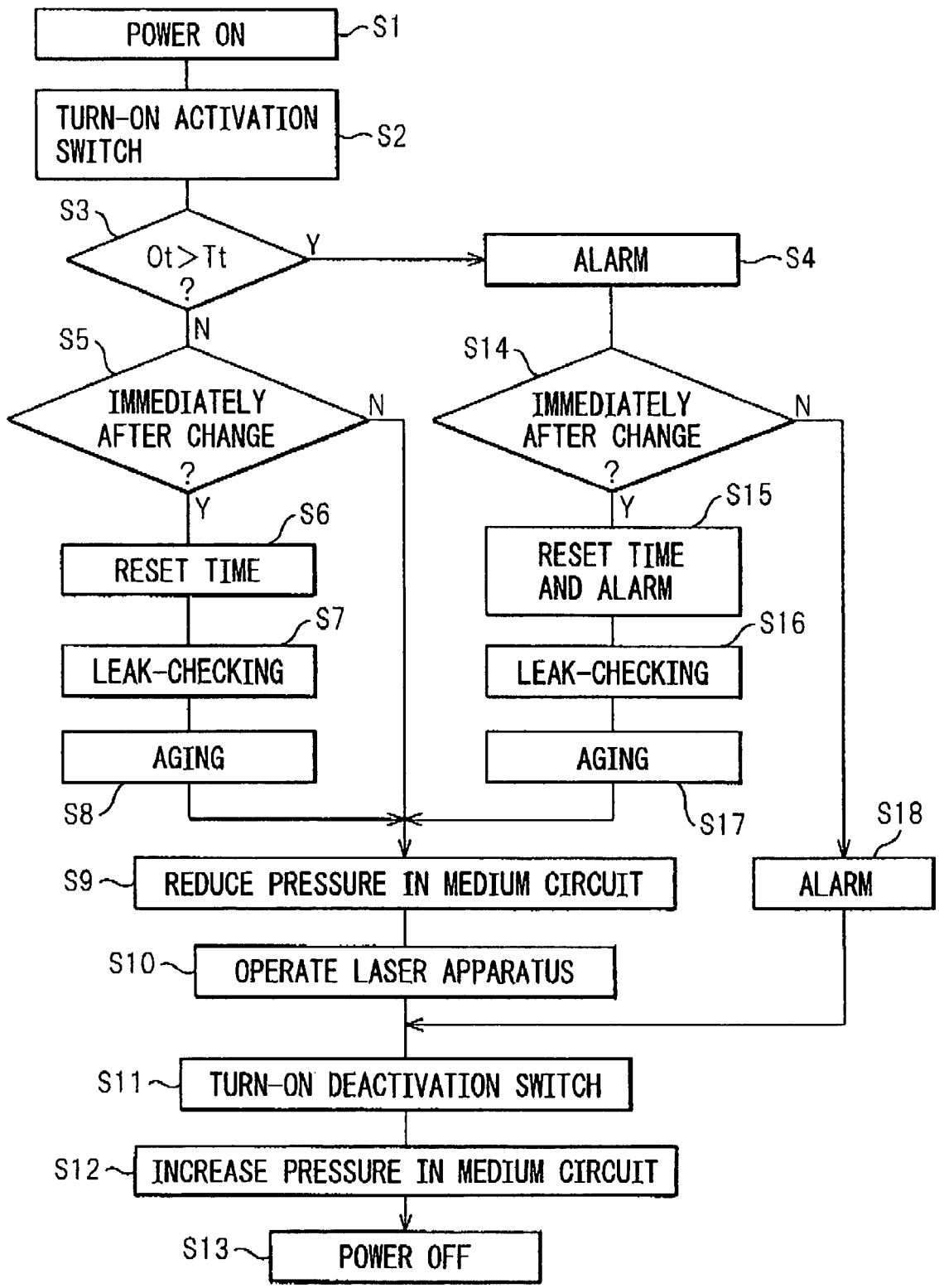
FIG. 8 is a flow chart for explaining a method for monitoring a blower in the gas laser apparatus of FIGS. 4 and 5.
Figure 9A:
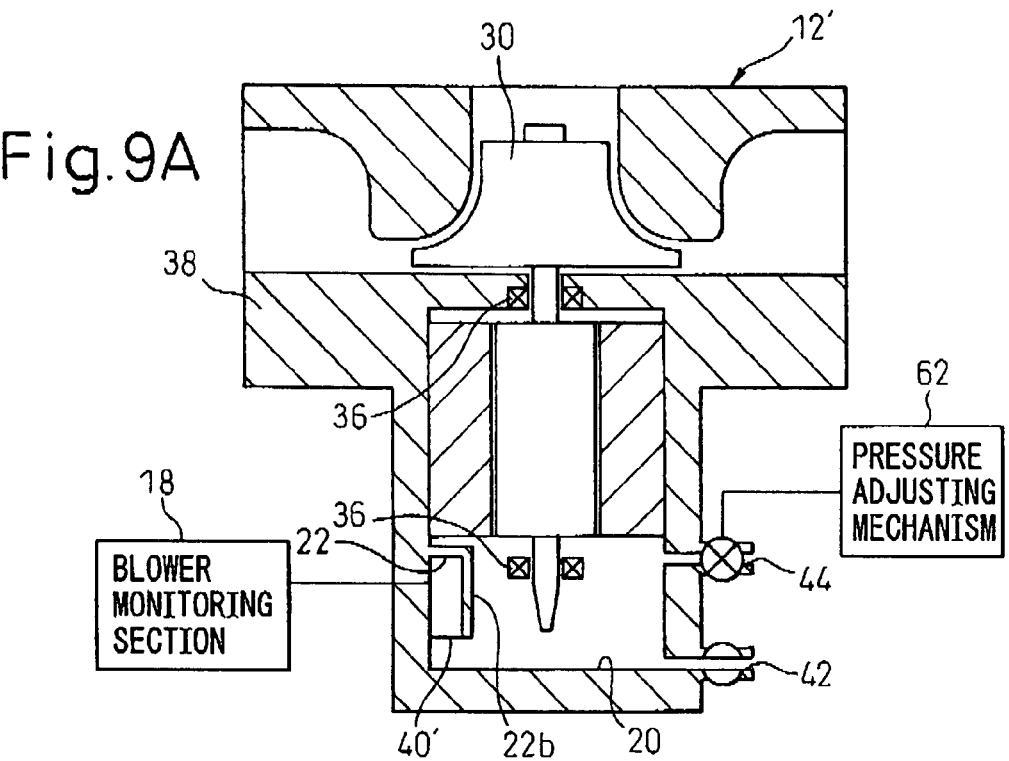
Figure 9B:
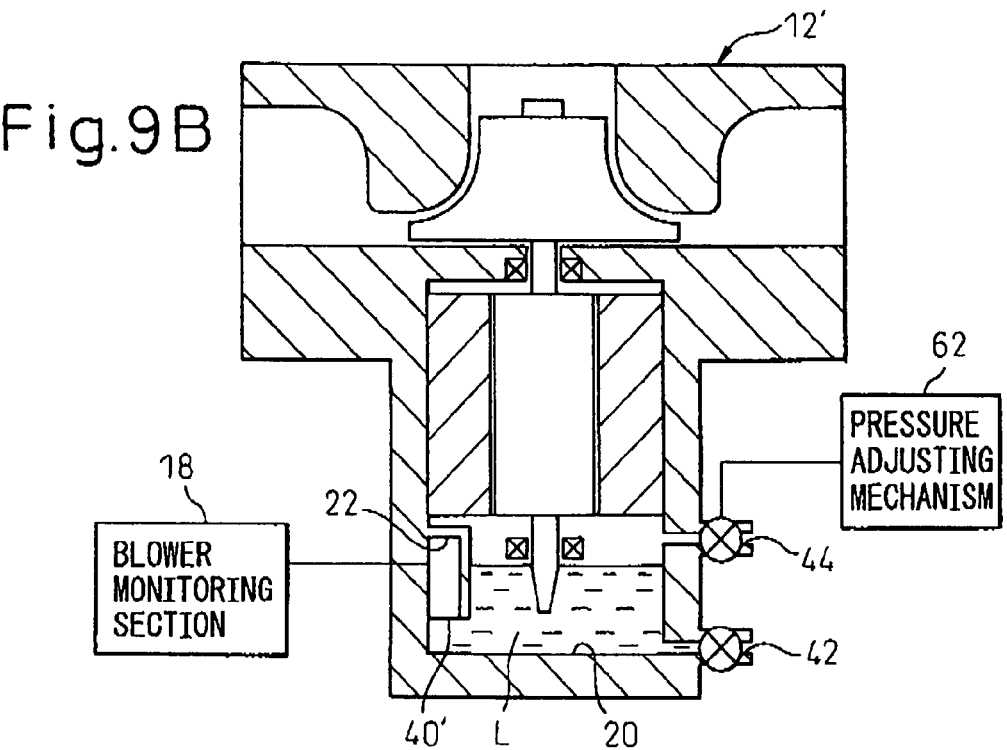

By utilizing the above described state transition of the blower 12, in the operation of the gas laser apparatus 60, 70, the method for monitoring (or for managing the maintenance time of) the blower 12 is performed in a procedure shown in FIG. 8. Hereinafter, the monitoring method will be described according to the flow chart.

When the gas laser apparatus 10 is energized or the power thereof is turned on (step S1) and thereafter the activation switch is turned on (step S2), the control section 74 (FIG. 5) operates, immediately thereafter, to compare the actual operating time Ot of the laser oscillating section 16 measured by the time measuring section 72 (FIG. 5) with a predetermined threshold value Tt, so as to judge whether the actual operating time Ot exceeds the threshold value Tt (step S3). When the actual operating time Ot exceeds the threshold value Tt, the control section 74 outputs the alarm signal (step S4) and informs the operator of the arrival of the lubricant change time by any means, such as a display on a display unit (not shown) and the like.

When the actual operating time Ot is judged, in step S3 to be equal to or less than the threshold value Tt, the blower monitoring section 18 is activated before the above described preliminary operation for activation is started, in step S5, so as to check, by the lubricant detecting section 24, whether the lubricant L is present in the lubricant monitoring chamber 22. When the lubricant L is not present in the lubricant monitoring chamber 22 at this time, the lubricant-change judging section 26 judges that the lubricant L stored in the lubricant storage chamber 20 is in a state immediately after the lubricant change, and the control section 74 automatically initializes or resets the actual operating time Ot of the laser oscillating section 16 measured by the time measuring section 72 (step S6). Further, the control section 64, 74 (FIGS. 4 and 5) allows the laser oscillating section 16 to automatically perform leak-checking (step S7) and aging (step S8). Thereafter, the control section 64, 74 starts the preliminary operation for activation of the laser oscillating section 16, so that pressure in the medium circuit 14 is reduced by a pump and the like (not shown) and pressure in the lubricant storage chamber 20 is reduced by the pressure adjusting mechanism 62 (step S9).

When the lubricant L is present in the lubricant monitoring chamber 22 and the lubricant-change judging section 26 judges, in step S5, that the lubricant L stored in the lubricant storage chamber 20 is not in a state immediately after the lubricant change, the control section 64, 74 does not perform the initialization of the time measuring section 72, leak-checking and aging, but starts the preliminary operation for activation of the laser oscillating section 16 (step S9). Thereafter, the gas laser apparatus 60, 70 operates as required (step S10). Next, when the deactivation switch of the gas laser apparatus 60, 70 is turned on (or the activation switch is turned off) (step S11), the control section 64, 74 starts the above described preliminary operation for deactivation of the laser oscillating section 16, so that the pressure in the medium circuit 14 of the laser oscillating section 16 is increased, and at the same time, the pressure in the lubricant storage chamber 20 is increased to atmospheric pressure by the pressure adjusting mechanism 62 (step S12). After the pressure increasing operation is completed, the power switch can be turned off (step S13).

When the actual operating time Ot is judged, in step S3, to exceed the threshold value Tt, the alarm signal is output in step S4, and thereafter, similar to above described step S5, the blower monitoring section 18 judges whether the lubricant L stored in the lubricant storage chamber 20 is in a state immediately after the lubricant change (step S14). When the lubricant L is in the state immediately after the lubricant change (e.g., when the operator has changed the lubricant L voluntarily), the control section 74 automatically initializes or resets the time measuring section 72 and the alarm signal (step S15) and allows the laser oscillating section 16 to automatically perform the leak-checking (step S16) and the aging (step S17), similarly to steps S6 to S8 described above. Thereafter, the control section 64, 74 starts the preliminary operation for activation of the laser oscillating section 16 (step S9).

When it is judged, in step S14, that the lubricant L is not in the state immediately after the change, the control section 74 operates to output the alarm signal again (step S18) to inform the operator of the arrival of the lubricant change time, and to forcibly deactivate the operation of the laser oscillating section 16. This forcible deactivation provides the same result as that of the turning-on of the deactivation switch in step S11, and thus the gas laser apparatus 60, 70 is safely deactivated.

In the embodiments described above, the blower 12 is configured so that the lubricant monitoring chamber 22 is defined by an airtight wall portion 22a that locally protrudes outside the casing 38. Alternatively, as shown in FIGS. 9A to 10B, the gas laser apparatus 10, 60, 70 according to the present invention may use a blower 12' having a configuration in which the lubricant monitoring chamber 22 is defined by an airtight wall portion 22b that locally extends inside the casing 38. In this connection, FIGS. 9A, 9B, 10A and 10B correspond to FIGS. 6A, 6B, 7A and 7B, respectively.

As shown in the drawings, in the blower 12', the lubricant storage chamber 20 and the lubricant monitoring chamber 22 are communicated with each other through an opening 40' having a certain diameter, which opens at the bottom end of the lubricant monitoring chamber 22 as seen in the direction of gravity, when the blower 12' is disposed in a normal upright orientation (i.e., in the illustrated orientation in which the impeller 30 is directed upward) on a stationary surface. In this connection, the lubricant monitoring chamber 22 is defined in the casing 38 as a hermetically closed space that has no opening permitting fluid to flow, other than the opening 40'. The above described method for monitoring (or managing the maintenance time of) the blower 12 may also be effectively implemented for the blower 12' configured as described above.

In either configuration, the blower 12, 12' can be provided with the lubricant monitoring chamber 22 having a simple structure, so that it is possible to reduce the equipment cost relating to the blower.

As will be apparent from the above description, in the gas laser apparatus according to the present invention, the blower monitoring section can automatically judge whether the lubricant in the blower is in a state immediately after the lubricant change, by monitoring the presence of the lubricant L in the lubricant monitoring chamber, and therefore, it is possible to automatically manage a lubricant change time without requiring an operator's manual work. Moreover, the judgment by the blower monitoring section is automatically performed without depending on instructions of an operator, and therefore, burden on an operator is reduced and a risk of erroneous instructions by an operator is effectively eliminated. Therefore, in the gas laser apparatus 10, it is possible for the operator to perform the lubricant changing operation indispensable for the maintenance of the blower at suitable times (e.g., periodically), and as a result, the gas laser apparatus can operate stably for a long period of time.

While the present invention has been described above with regard to the gas laser apparatus using the gaseous laser medium, the present invention may also be defined as a method and device for monitoring a maintenance state of a blower adapted to be provided in a gas laser apparatus, as follows.

The present invention is directed to a blower monitoring method for monitoring a maintenance state of a blower 12, including the steps of providing the blower 12 with a lubricant storage chamber 20 for storing a lubricant L and a lubricant monitoring chamber 22 connected to the lubricant storage chamber 20 to ensure fluidic communication therebetween at a position lower than an oil level S of a lubricant or lubricating oil L having a predetermined appropriate volume and stored in the lubricant storage chamber 20; detecting that a lubricant L stored in the lubricant storage chamber 20 of the blower 12 flows into the lubricant monitoring chamber 22 and at least a part of the lubricant L is present in the lubricant monitoring chamber 22, as a result of internal-pressure change in the lubricant storage chamber 20; and monitoring whether the presence of the lubricant L in the lubricant monitoring chamber 22 is detected, and judging that, when the presence is not detected, the lubricant L stored in the lubricant storage chamber 20 is in a state immediately after a lubricant change.

Also, the present invention is directed to a blower monitoring device for monitoring a-maintenance state of a blower 12, wherein the blower 12 includes a lubricant storage chamber 20 for storing a lubricant L; and a lubricant monitoring chamber 22 connected to the lubricant storage chamber 20 to ensure fluidic communication therebetween at a position lower than an oil level S of a lubricant or lubricating oil L having a predetermined appropriate volume and stored in the lubricant storage chamber 20; and wherein the blower monitoring device includes a lubricant detecting section 24 for detecting that a lubricant L stored in the lubricant storage chamber 20 of the blower 12 flows into the lubricant monitoring chamber 22 and at least a part of the lubricant L is present in the lubricant monitoring chamber 22, as a result of internal-pressure change in the lubricant storage chamber 20; and a lubricant-change judging section 26 for monitoring whether the lubricant detecting section 24 detects the presence of the lubricant L in the lubricant monitoring chamber 22 and judging that, when the lubricant detecting section 24 does not detect the presence of the lubricant L, the lubricant L stored in the lubricant storage chamber 20 is in a state immediately after a lubricant change.

It should be noted that the use of the blower monitoring method and the blower monitoring device, described above, is not limited to the gas laser apparatus.

While the invention has been described with reference to specific preferred embodiments, it will be understood, by those skilled in the art, that various changes and modifications may be made thereto without departing from the scope of the following claims.

The invention claimed is:

1. A gas laser apparatus comprising:
   a laser oscillating section including a blower forcibly circulating a medium gas in a medium circuit; and
   a blower monitoring section monitoring a maintenance state of said blower;
   said blower comprising:
      a lubricant storage chamber storing a lubricant; and
      a lubricant monitoring chamber connected to said lubricant storage chamber to ensure fluidic communication therebetween at a position lower than an oil level of a lubricant having a predetermined appropriate volume and stored in said lubricant storage chamber;
   said blower monitoring section comprising:
      a lubricant detecting section detecting that a lubricant stored in said lubricant storage chamber of said blower flows into said lubricant monitoring chamber and at least a part of the lubricant is present in said lubricant monitoring chamber, as a result of internal-pressure change in said lubricant storage chamber; and
      a lubricant-change judging section monitoring whether said lubricant detecting section detects a presence of said lubricant in said lubricant monitoring chamber, before said laser oscillating section is activated, and judging that, when said lubricant detecting section does not detect said presence, said lubricant stored in said lubricant storage chamber is in a state immediately after a lubricant change.

2. A gas laser apparatus as set forth in claim 1, further comprising a control section controlling an operation of said laser oscillating section, and a pressure adjusting mechanism adjusting an internal pressure of said lubricant storage chamber of said blower in a manner as to accompany a preliminary operation for each of activation and deactivation of said laser oscillating section; wherein said control section controls an internal-pressure adjusting operation for said lubricant storage chamber performed by said pressure adjusting mechanism, simultaneously with an execution of adjustment of an internal-pressure of said medium circuit as said preliminary operation.

3. A gas laser apparatus as set forth in claim 1, further comprising a control section controlling an operation of said laser oscillating section, and a time measuring section measuring an actual operating time of said laser oscillating section after said lubricant stored in said lubricant storage chamber of said blower is changed; wherein said control section controls an operation of said laser oscillating section based on said actual operating time measured by said time measuring section and a judging result of said lubricant-change judging section of said blower monitoring section.

4. A gas laser apparatus as set forth in claim 3, wherein said lubricant-change judging section judges that, when said lubricant detecting section detects said presence of said lubricant in said lubricant monitoring chamber before said laser oscillating section is activated, said lubricant stored in said lubricant storage chamber is not in a state immediately after the lubricant change; and wherein said control section operates to compare said actual operating time of said laser oscillating section measured by said time measuring section with a predetermined threshold value, output an alarm signal when said actual operating time exceeds said threshold value, and, after said alarm signal is output, forcibly deactivate an operation of said laser oscillating section when said lubricant-change judging section judges that said lubricant is not in a state immediately after the lubricant change.

5. A gas laser apparatus as set forth in claim 3, wherein said control section operates to automatically initialize said actual operating time of said laser oscillating section measured by said time measuring section, when said lubricant-change judging section judges that said lubricant is in a state immediately after the lubricant change.

6. A gas laser apparatus as set forth in claim 2, wherein said control section operates to allow said laser oscillating section to automatically perform an operation for checking a leakage of a medium gas in said medium circuit, when said lubricant-change judging section judges that said lubricant is in a state immediately after the lubricant change.

7. A gas laser apparatus as set forth in claim 2, wherein said control section operates to allow said laser oscillating section to automatically perform an operation for removing foreign matter that have entered said medium circuit, when said lubricant-change judging section judges that said lubricant is in a state immediately after the lubricant change.

8. A gas laser apparatus as set forth in claim 3, wherein said control section operates to allow said laser oscillating section to automatically perform an operation for checking a leakage of a medium gas in said medium circuit, when said lubricant-change judging section judges that said lubricant is in a state immediately after the lubricant change.

9. A gas laser apparatus as set forth in claim 3, wherein said control section operates to allow said laser oscillating section to automatically perform an operation for removing foreign matter that have entered said medium circuit, when said lubricant-change judging section judges that said lubricant is in a state immediately after the lubricant change.

10. A gas laser apparatus as set forth in claim 1, wherein said blower includes a casing defining said lubricant storage chamber and said lubricant monitoring chamber; and wherein said lubricant monitoring chamber is defined by an airtight wall portion locally protruding outside said casing.

11. A gas laser apparatus as set forth in claim 1, wherein said blower includes a casing defining said lubricant storage chamber and said lubricant monitoring chamber; and wherein said lubricant monitoring chamber is defined by an airtight wall portion locally extending inside said casing.

12. A blower monitoring method for monitoring a maintenance state of a blower, comprising:
providing said blower with a lubricant storage chamber storing a lubricant and a lubricant monitoring chamber connected to said lubricant storage chamber to ensure fluidic communication therebetween at a position lower than an oil level of a lubricant having a predetermined appropriate volume and stored in said lubricant storage chamber;
detecting that a lubricant stored in said lubricant storage chamber of said blower flows into said lubricant monitoring chamber and at least a part of the lubricant is present in said lubricant monitoring chamber, as a result of internal-pressure change in said lubricant storage chamber; and
monitoring whether a presence of said lubricant in said lubricant monitoring chamber is detected, and judging that, when said presence is not detected, said lubricant stored in said lubricant storage chamber is in a state immediately after a lubricant change.

13. A blower monitoring device for monitoring a maintenance state of a blower, said blower comprising:
a lubricant storage chamber storing a lubricant; and
a lubricant monitoring chamber connected to said lubricant storage chamber to ensure fluidic communication therebetween at a position lower than an oil level of a lubricant having a predetermined appropriate volume and stored in said lubricant storage chamber;
said blower monitoring device comprising:
a lubricant detecting section detecting that a lubricant stored in said lubricant storage chamber of said blower flows into said lubricant monitoring chamber and at least a part of the lubricant is present in said lubricant monitoring chamber, as a result of internal-pressure change in said lubricant storage chamber; and
a lubricant-change judging section monitoring whether said lubricant detecting section detects a presence of said lubricant in said lubricant monitoring chamber and judging that, when said lubricant detecting section does not detect said presence, said lubricant stored in said lubricant storage chamber is in a state immediately after a lubricant change.

* * * * *